United States Patent Office 3,389,161
Patented June 18, 1968

3,389,161
PROCESS FOR DISPLACING ALKYL RESIDUES FROM TRIALKYL ALUMINUM COMPOUNDS
Gerald W. Kottong, St. Paul, Minn., and Oran A. Ritter, Baton Rouge, La., assignors to Ethyl Corporation, New York, N.Y., a corporation of Virginia
Continuation-in-part of application Ser. No. 117,358, June 15, 1961. This application Jan. 19, 1966, Ser. No. 521,625
23 Claims. (Cl. 260—448)

This invention is a continuation-in-part of our copending application Ser. No. 117,358, filed June 15, 1961, and now abandoned, entitled, "Hydrocarbon Production."

This invention relates to the preparation of hydrocarbons and organo aluminum compounds of selected molecular weight by a process involving the formation of trialkyl aluminum compounds of a selected molecular weight or weight range and displacement of the alkyl residues with olefins of a selected different molecular weight or weight range thereby producing olefins corresponding to the alkyl residues originally contained on the trialkyl aluminum compounds.

Displacement of alkyl residues from trialkyl aluminum compounds by olefins is not new having been discussed by Ziegler and Gellert in U.S. Patent 2,835,689 as a low temperature, long contact time batch operation and in the more recent U.S. Patent to Zosel 3,180,881 as a high temperature, short contact time proposition of a concurrent flow nature. A common characteristic of these prior art displacements is a mass equilibrium contacting in which essentially a single overall equilbium condition exists because all the reactants and products remain together throughout virtually the entire displacement period. With such a situation, when one seeks to achieve a high degree of displacement large excesses of displacing olefin are required to be supplied to the displacement reactor since the statistical distribution of all organo materials present is virtually the sole determining factor for product compositions exclusive of stopping the reaction at an incomplete state. This frequently involves a large recirculating olefin stream of the order of 22-35:1 and Zosel 3,180,881 even noted an experiment with a 1500:1 ratio of olefin to aluminum alkyl as providing useful result. This olefin stream must be in contact with aluminum alkyls under conditions which cannot completely avoid the occurrence of typical reactions of unsaturates such as undesired polymerization, isomerization and dimerization to branched chains since aluminum alkyls are well known catalysts for such reactions. Therefore one must be willing to accept the formation of significant quantities of impurities of the order of 5% or more as an unavoidable consequence of achieving reasonable reaction rates.

Accordingly it is an object of the present invention to provide an improved process for displacing alkyl residues from trialkyl aluminum compounds permitting high displacement percentages.

Another object of the present invention is to provide a displacement process of the foregoing type wherein large recirculating streams of displacing olefins can be avoided.

Another object of the present invention is to provide a countercurrent displacement technique of the foregoing type in which a stream of trialkyl aluminum in the liquid phase is contacted by a displacing olefin stream essentially in the vapor phase.

Another object of the present invention is to provide a displacement process of the foregoing type which avoids the extreme temperature conditions employed in certain prior art displacement techniques.

Other and further objects and features of the present invention will become apparent upon a careful consideration of the following description and drawings wherein.

We have now discovered that displacement can be performed in an entirely different manner from the foregoing prior art to provide improved results as to displacement rate and completeness. The new process permits a significant reduction in the volume of circulating displacing material and even in some instances virtual elimination of recirculating material yielding the incidental benefit of a reduction in the extent of olefin side reactions of an adverse nature such as thermal decomposition, isomerization and undesirable polymerization and dimerization to branched chains. With the new process it is possible to readily displace up or down in terms of relationship of the molecular weight of displacing olefins to the molecular weight of the alkyl residues present on the input aluminum compounds.

The benefits of the present invention are realized through a displacement process perhaps best described as countercurrent contacting with plural equilibria. The organo aluminum feed material is typically trialkyl aluminum compounds or mixtures, as well as alkyl aluminum hydrides and the like. In the preferred cases, the materials are trialkyl aluminum compounds or mixtures whose alkyl group range from ethyl to about eicosyl, such as triisobutyl aluminum. The aluminum alkyl is in the liquid phase in an elongated reaction zone and flows countercurrent to displacing material which is essentially in the vapor phase. This is obtainable with several arrangements of auxiliary apparatus selected to utilize to advantage the various boiling point relationships of the olefins and alkyls. The first apparatus arrangement to be discussed is usually preferred where the trialkyl aluminum material to be subjected to displacement contains residues which have a greater number of carbon atoms (individual residues) than the displacing olefins. In this situation one frequently finds that certain product aluminum alkyls, typically triethyl aluminum, have a boiling point which is lower than some of the displaced product olefin. The apparatus of FIG. 1 illustrates the preferred method of handling this problem.

Figure 1:
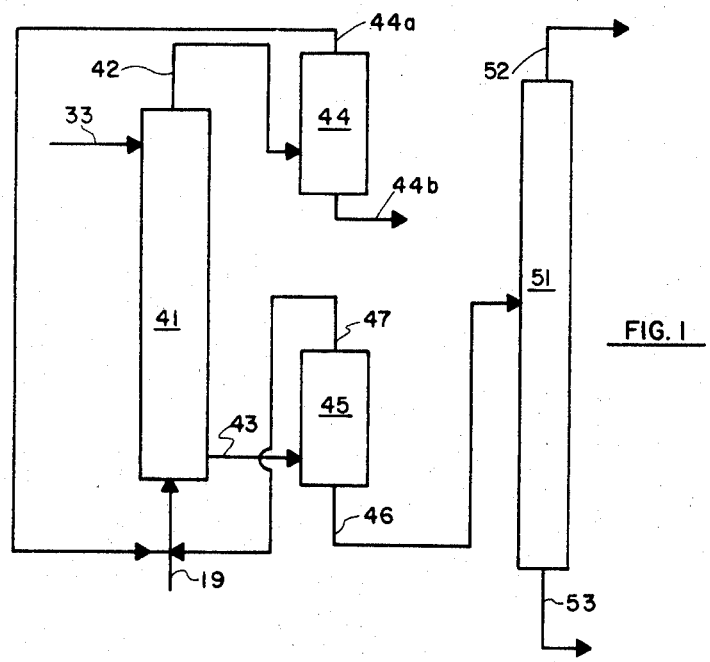
FIG. 1 shows an apparatus arrangement for countercurrent displacement using olefin in the vapor phase.

The reaction is conducted in the apparatus of FIG. 1 as typified with a vertically elongated reaction zone in a packed or compartmented reactor 41 or an equivalent plurality of reactors. The packing or compartmentation is employed to provide a reactor dwell time greater than free gravity fall for the alkyl aluminum material and the material of construction involved must not be adversely reactive. Stainless steels are generally suitable and preferable.

Preferably the reactor is insulated and provided with a heat jacket which is omitted from the drawing for clarity but by means of which a desirable reactor temperature can be maintained favorable to interaction of the alkyl aluminum material and the displacing material. The temperature is from about 100° C. to about 300° C., preferably from about 175° C. to about 250° C. to reduce side reactions and avoid extremely high reaction rates, even more preferably about 200° C. however for those instances where the lower olefins such as ethylene constitute the displacing material it frequently is desirable to operate at temperatures at the low end of the range to avoid the need for extremely high pressures.

The pressure of operation is normally critical to some extent however not so much as to reactivity as to volatility and in general is controlled to maintain a vapor phase condition for the olefin and a liquid phase condition for the aluminum alkyl material. A stripper gas having a higher volatility than the average of the displacing material can frequently permit higher pressures to be used where such is convenient. Exemplary pressures range from a fraction of a pound per square inch absolute up to about 700 pounds per square inch gage.

The input trialkyl aluminum material, typically trioctyl aluminum, tridecyl aluminum, tridodecyl aluminum, tritetradecyl aluminum, or various mixtures thereof, and the like, is supplied to the reactor near one end thereof through line 33. The output trialkyl aluminum material, typically triethyl aluminum to the extent of 95% to better than 99% of the alkyl residues contained on the aluminum present at that point, is withdrawn at the second end of the reactor 41 through line 43.

The displacing material, typically olefin of molecular weight corresponding to the alkyl residues desired on the product trialkyl aluminum, in this instance ethylene, is supplied in the vapor phase at the second end of the reaction zone through line 19 and passes upward in contact with the downward flowing liquid trialkyl aluminum material. In this embodiment excess ethylene, together with some displaced olefins and some olefin that may have accompanied the feed trialkyl aluminum material, leaves the reactor through line 42, passes to flash distillation 44 for separation of the ethylene for recycle through line 44a and withdrawal of the displaced olefins through line 44b. The result of this arrangement is that at least a part of the displaced olefins are swept overhead and removed through line 42 so that the bottom section of the reaction zone is richer in displacing olefin. This brings about the existence in the reactor of a plurality of progressively different equilibria in which the displacing material nearest the exit for trialkyl aluminum material has a higher percentage of displacing material (input olefin) relative to displaced individual residues (product olefin) than exists in the total mass in the reactor. This important point favors the displacing material at the region of last contact with the trialkyl aluminum material and permits a reduction in the volume of the recirculating (displacing) olefin stream for an equivalent result to that of concurrent displacement. Thus the amount of olefin in contact with the trialkyl aluminum material and hence subject to side reactions is much less. Although this generally permits a smaller reactor volume than in the batch contacting system of U.S. Patent 2,835,689, there is no need for the severe operating temperature conditions of U.S. Patent 3,180,881 which push the materials so close to their decomposition temperatures as to leave little tolerance for process upsets.

The countercurrent contacting in the arrangement of FIG. 1 with ethylene as a displacing olefin takes place at temperatures from about 90° C. to about 125° C., more preferably from about 100° C. to about 120° C., typically about 110° C., as a preferred compromise between good reaction rate and freedom from adverse side reactions. These temperatures are associated with pressures from about 500 p.s.i.g. to about 700 p.s.i.g., preferably 550 p.s.i.g. to about 650 p.s.i.g., typically 600 p.s.i.g. In some instances the reaction is enhanced by conducting it in the presence of displacement catalysts such as active nickel on a suitable carrier solid which also forms a packing for reactor 41

In comparing the present invention with the prior art as to relationship of displacement effectiveness to mole ratio of displacing olefins to alkyl residues one must be particularly careful as to the displacements in question. Without this caution we have the seeming paradox that an example involving a 20:1 ratio is here called a low ratio and prior art ratios of 2:1 are called high. Thus we must compare ratios in different categories.

The first category is the displacement of higher mixed alkyl groups using ethylene to produce triethyl aluminum. In this category a ratio of 20:1 gives practically 98% conversion with the present process whereas with Zosel 3,180,881, ratios of about 35:1 are required for conversion of about 96%.

In a second category, straight chain higher olefins such as butene-1 or mixtures including components having up to about 20 carbon atoms per molecule are used to displace lower branched alkyl groups such as triisobutyl from aluminum. Here displacement of 99.3% was obtained with an olefin/alkyl group ratio of 1.1:1. This compares with the prior art conversion of 91% for a similar ratio of components.

In a third category an alkyl aluminum mixture containing various percentages of components of the range from tributyl aluminum to about trieicosyl aluminum is reacted with straight chain olefins containing various percentages of components of that same range, the distribution as to percentage of each carbon atom component being different in the alkyls and olefins. This type of operation is important where it is desired to alter the peaking or distribution as to size of alkyl reactions of an aluminum alkyl mixture. The present countercurrent process can achieve 80% displacement which is excellent in this operation with a ratio of displacing olefin to alkyl residues of 1.057:1. A similar displacement percentage with the prior art requires a ratio of about 4:1.

The effluent trialkyl aluminum material in line 43 contains some olefin corresponding to the displaced alkyl residues in terms of carbon atoms in the individual alkyl residues and carbon atoms in the olefin molecules as well as to the displacing olefins. These olefins are readily removed from the effluent trialkyl aluminum stream by a flash distillation 45 which removes the lower olefins (mainly ethylene) through line 47 for recycle and delivers the triethyl aluminum together with higher olefins through line 46 to distillation device 51. Distillation device 51 separates the olefins from the triethyl aluminum, olefins usually being obtained as a bottoms stream in line 53 and triethyl aluminum as an overhead stream in line 52.

Overall throughput rates of input trialkyl aluminum compound and displacing material whether viewed from a mass flow or contact time basis are not critical to the extent that exists with the prior art where serious problems as to temperature requirements generally seriously regiment flow rates and heat input and removal rates. Virtually any rate or ratio of materials that will be selected will provide improved displacement extent per unit of displacing material supplied to the reactor in comparison to the prior art. In addition the ratio of side reactions per unit of displacing material is not significantly greater than with the prior art and is usually much lower. The usual concepts of engineering economics as to flow rates and degree of conversion will normally provide the most valuable definitions in this regard. Thus one prefers flow rates and ratios in accordance with the following considerations.

Countercurrent displacement performed in a vertical column has numerous interesting variations depending upon the boiling points of the materials involved. Actually the ethylene and triethyl aluminum case just described is perhaps the most difficult to perform in a countercurrent manner because it is not practical to adjust reactor pressures so as to carry all displaced olefins overhead without simultaneously contaminating them with displaced alkyl aluminum product.

Where the displacing olefins are of a molecular weight corresponding to about decene-1 and higher there is no longer the problem of excessive volatility of the displaced aluminum alkyls, however there can be a complementary problem namely that of inadequate volatility of the displacing olefins. Although the apparatus of FIG. 1 can be used for such by merely operating under lower pressure, and adjusting the distillation streams as appropriate, greater breadth and variation is illustrated with the assistance of FIG. 2 in which the displacing olefins are supplied to the top of the column together with the input trialkyl aluminum material and use is made of a stripping gas or vapor feed at the bottom which carries the displacing and displaced olefins overhead in the vapor phase so that an excellent counterflow of liquid aluminum alkyls and vapor phase olefin is maintained even with quite small volumes of stripping gas. As a practical matter the stripping gas if other than a displacing olefin is conveniently an inert saturated hydrocarbon typically isooctane, decane, tetradecane, or the like, where the displacing olefins have from about 8 to 20 carbon atoms per molecule. The stripper gas is generally used in a quantity from about 0.1 to 10 times the weight of the top feed, preferably this factor being about 0.5 to achieve high conversion per unit reactor volume. Where the displacing olefins include a significant proportion of hexene-1 and lower olefins, these provide convenient substitution for all or part of the stripping gas and in general will be used in the ratio in which they are present in the displacing olefin feed with make-up isooctane to the extent required to achieve stripping of the higher olefin content fed from overhead.

The trialkyl aluminum feed material in such operation is generally a lower branched residue alkyl having from about three to about ten carbon atoms per residue. A typical material is triisobutyl aluminum which is frequently preferred because it is easy to produce and because the resulting isobutylene is readily distillable from excess displacing olefins which are generally of higher molecular weight and boiling point.

Figure 2:
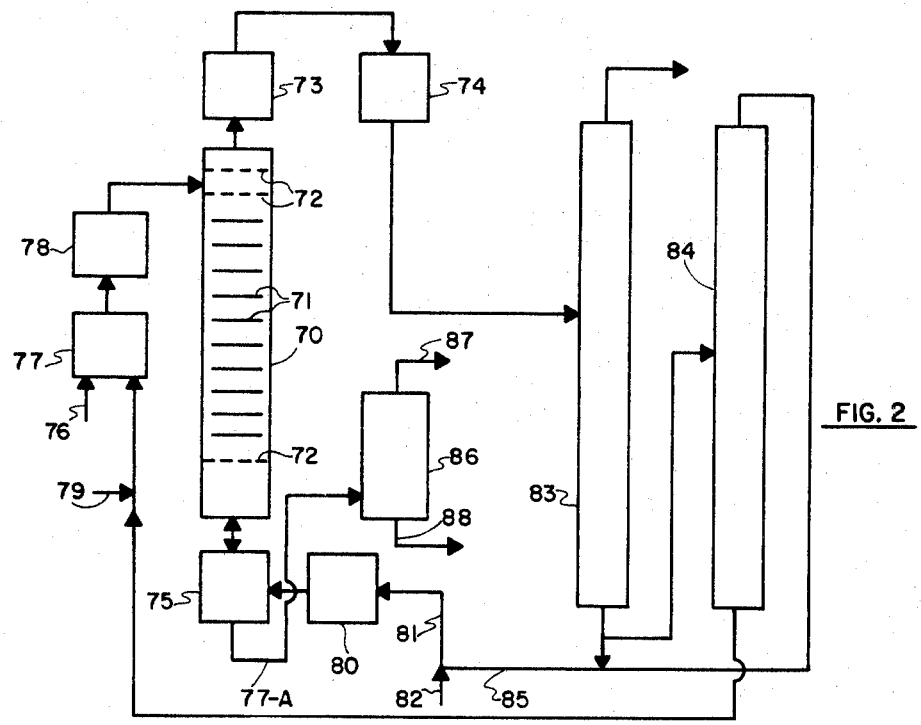
FIG. 2 shows an apparatus arrangement which is desirable in several process variations where the displacing olefins contain significant proportions of olefins having a molecular weight greater than about hexene-1.

Such stripping operation can be visualized better with reference to FIG. 2 in which the reactor 70 is illustrated as a tower type reactor having ten trays 71 plus top and bottom sieve plates 72 which seek to control distribution of flow in the vessel and which like several other details of FIG. 2 are equally applicable to FIG. 1. The reactor is equipped with an overhead cooler 73, condenser 74, and also a reboiler 75. The vessel has provision for maintenance of desired reaction temperatures and pressures in addition to heat input from the reboiler. Trialkyl aluminum feed is obtained from line 76 and passes through mixer 77 and heater 78. The displacing olefins, or the higher molecular weight components thereof (generally those of molecular weight of octene-1 and higher) are fed through line 79 and mixed with the feed trialkyl aluminum material, a convenient arrangement because of volatility considerations. This arrangement causes a downward flow of trialkyl aluminum material and part of the displacing olefin however this flow is met by an upward flow of lower displacing olefins (hexene-1 and lower molecular weight) or stripper gas or a combination of lower olefins and stripper gas such being supplied through the reboiler 75, heater 80 and line 81. The lower displacing olefin is obtained through line 82 whereas the stripper gas is recovered from the overhead condensate by distillation devices 83 and 84, being returned via line 85.

Trialkyl aluminum material withdrawn through line 77–A is distilled at 86 to remove olefins in line 87 and provide product trialkyl aluminum in line 88.

The overhead from distillation device 83 normally is principally lower olefin corresponding on a carbon atoms per molecule basis to the alkyl residues contained on the input trialkyl aluminum material at line 76. As will be noted presently, this trialkyl aluminum material is typified as triisobutyl aluminum in which instance the overhead from 83 will be triisobutylene. Other lower olefins may be present at this point due to any of a number of reasons, however, this does not significantly alter the operation discussed. For example, since operations such as those of the present invention are frequently associated with ethylene polymerization, residual or even deliberate quantities of ethylene may be in some of the streams. Due to pressure consideration such ethylene will generally move rapidly to the overhead of distillation device 83.

The bottoms of distillation device 84 will in general be residual displacing olefins that pass through the reactor 70 without becoming involved in displacement. This arises because in the interest of securing a high degree of selectivity in the product trialkyl aluminum compounds (say 99% or better) one usually finds it advantageous to supply to the reactor 70 a slight excess of displacing olefins. Actually this excess is usually merely 10% in contrast to the 200% to 400% or more customary in the prior art for equivalent displacements. Although the lighter components of the recirculated excess displacing olefins, such as hexene-1, will generally pass overhead in distillation device 84 so as to be recirculated via vaporization in the reboiler 75 with recirculated stripper material, it is not desired to recirculate the heavier components of the excess displacing olefin via this route in the stripper operation presently under discussion because pressures involved in such do not permit adequate vaporization in the reboiler. Thus as with the higher boiling constituents of the feed displacing olefins, these recirculated olefin components are returned to the top feed via mixer 77 and heater 78.

In a further embodiment of the teachings of the present invention the fundamental system of countercurrent displacement is employed with a feed of mixed higher olefins typically ranging from dodecene-1 and eicosene-1, particularly olefins of that range having an even number of carbon atoms per molecule. The trialkyl aluminum material is also a mixture of compounds, such a mixture having a typical Poisson distribution (set forth in Example 4) as obtained from an ethylene chain growth operation. The purpose of this manipulation is to provide a highly desired peaked trialkyl aluminum material with certain selected components predominating.

The exposition of this embodiment can be made in connection with FIG. 1 and in this stance operation is discussed so as to illustrate the application of the present invention to a situation where "higher" olefins are used in displacement but the stripper gas condition is avoided through the use of lower pressures in the system which provides the required olefin volatility. In this instance the displacing olefins are fed in only about a 10% excess $$\left(\text{mols olefin}\Big/\frac{\text{mol of AlR}_3}{3}\right)$$

relative to the amount reacting. Vinylidene olefin formation is held low, typically 0.5 pound of $C_{20}+$ material being found to appear in products per mol of aluminum feed.

Feed trialkyl aluminum mixtures to line 33 contain for illustrative purposes various percentages of alkyl residues ranging from about normal butyl to about normal eicosyl. The displacing olefin feed at line 19 contains various percentages of vinyl olefins ranging from about dodecene-1 to about eicosene-1 together with comparable or different ranges of similar olefins having the internal configuration and/or the vinylidene configuration. Effluent trialkyl aluminum materials and olefins also contain component ranges as to molecular weights.

In this embodiment displacement temperatures range from about 100° C. to about 300° C. limited at the lower level by increased side reactions and at the upper level by overly rapid displacement rates making difficult the staging that contributes to the countercurrent form of operation. A more preferred range for the foregoing reasons is from about 175° C. to about 250° C. The most preferred temperature is about 200° C.

Pressures are less critical than temperatures as to direct effect upon the overall reaction, however they do involve significant effect upon the distribution results because of their effect upon volatility. Preferable pressures range from about 0.5 to 5.0 pounds per square inch absolute with the molecular weight materials exemplified herein, most preferable pressures being about 2 p.s.i.a. for the ranges of alkyls and olefins previously exemplified seeking peaking of alkyl residues at the $C_{12}$ to $C_{14}$ level from chain grown alkyl aluminum material having a Poisson distribution as to molecular weight.

As a result of the displacement, product olefins at line 42 have a different distribution from the displacing olefin feed. For example, where the olefin feed has a predominance of dodecene-1 and tetradecene-1 seeking to enhance the concentration of these components in the trialkyl aluminum product, one will find that the product olefins will in general pick up components above and below these as a result of displacement of comparable residues from the Poisson distributed alkyl feed. Distillation 44 then selects certain constituents of the product olefins for recycle to the reactor olefin feed.

At the same time the typical desired enhancement of the tridodecyl aluminum and tritetradecyl aluminum components is realized in the output trialkyl aluminum material obtained in line 43. Distillation of the output trialkyl aluminum material to remove residual olefin is accomplished in distillation 45 and the product trialkyl aluminum material may be purified further if desired in distillation 51.

EXAMPLE 1 (FIG. 1)

A trialkyl aluminum feed stream is selected containing a mixture of trialkyl aluminum compounds whose alkyl residues range from $C_4$ (normal butyl) to about $C_{20}$ (normal eicosyl) and which originally contained about a Poisson type of distribution on a carbon atom per residue basis and from which was removed much of the ethylene in a flash distillation. In addition the feed stream contains olefins approximately corresponding in molecular weight and distribution to the alkyl residues. The alkyl residue/olefin mol ratio is desirably greater than 1, preferably at least 2. Such a stream is a product of a catalytic polymerization of ethylene with minor subsequent separation because such separation, except possibly for most of the excess ethylene, is impractical by normal distillation separation techniques. The percentage of olefins is of no critical consequence, it being discussed here merely to show that such content of the feed stream does not have unduly adverse effect but to emphasize the general preference for at least an alkyl residue/olefin mol ratio of 1 to avoid an unduly large reactor. It is obvious that where reactor size is not of any great concern that ratios below 1 provide entirely satisfactory operation.

The feed stream thus exemplified is fed to reactor 41 through line 33, ethylene being fed at line 19. The reactor is maintained at an elevated temperature and pressure of the order of 110° C. and 600 pounds per square inch gage, respectively. The reaction can be enhanced by the presence of a displacement catalyst on a suitable carrier solid, however the enhanced contact between reactants attainable as a result of the carrier functioning as a tower packing is desirable even where the actual active component of the packing is omitted. The quantity of ethylene is fed in excess, so that the aluminum alkyl constituents react with ethylene to form triethyl aluminum. Depending upon the specific feed, typically about 4% of the ethylene fed at the bottom of the displacement reactor 41 is reacted, and the overhead gas stream from the reactor discharged through line 42 includes a substantial quantity of ethylene, typically amounting to about 90% by weight. A certain amount of ethylene appears in the reactor bottoms stream discharged through line 43, however the triethyl aluminum content corresponds almost fully to the quantity of alkyl residues introduced in the feed through line 33 in the form of trialkyl aluminum. The concentration of the olefin components of the bottoms stream typically include about 15% ethylene, and 60% of $C_{8-10}$. Further, the olefins include actually slightly more of $C_{12-16}$ components than that fed as olefins owing to the release of, or displacement of, such olefins in the conversion of the trialkyl aluminum components fed to triethyl aluminum. The bottoms stream from the displacement reactor 41 passes to the flash distillation 45, in which approximately 17% is typically flashed overhead through line 47, this being utilized independently of the present process or returned to feed as shown in FIG. 1. The overhead from this flash distillation 45 is predominantly ethylene, typically with minor quantities of $C_{4-8}$ olefins. The bottoms from the flash 45 contains substantially all the triethyl aluminum, typically in proportions of about 7 weight percent, the balance being olefin constituents predominating in $C_{3-10}$ olefins. Owing to the conversion of the alkyl aluminum constituents by the treatment in the displacement reaction 41, it is possible to distill in 51, at low pressures and temperatures, typically 20 millimeters mercury absolute pressure and about 90° C. an overhead having a high concentration, relatively, of triethyl aluminum. Thus this valuable catalyst can be recovered for reuse instead of being deliberately destroyed as has generally been done in prior polymerization practice. The bottoms from distillation 51 taken through line 53 comprise typically about 30% of the weight of the overhead stream of line 52, and consists essentially of olefins substantially free of aluminum alkyls. The said bottoms stream includes typically about 39% olefins in the $C_{12-16}$ range, and about 60% olefins in the range $C_{18}$ and higher olefins.

In the following Examples 2 and 3 countercurrent displacement was performed in a system of FIG. 2 with a reactor 70 having an internal diameter of 2.5 inches, containing 10 transverse perforated trays 71 having a centerline spacing of 3 inches. Each tray had an overflow wier providing a liquid depth on the trays adjustable from ⅜″ to ¾″. Above the top tray was placed a feed section containing two transverse sieve plates 72 spaced 3″, each having 500 holes of 1 mm. diameter. A similar plate 72 was placed below the bottom tray.

EXAMPLE 2

In this run the aluminum alkyl to be subjected to displacement was aluminum triisobutyl and the displacing material was a mixture of hexene-1, octene-1, and decene-1 of proportions shown below. The input olefins were divided into two streams. The octene-1 and decene-1 were mixed with the input aluminum alkyl, heated and fed to the top of the column in liquid state. The hexene-1 was fed to the reboiler to operate as displacing olefin and also as stripper gas for the octene-1 and decene-1 to provide a countercurrent vapor state flow thereof relative to the downwardly flowing aluminum alkyl which latter experiences inconsequential stripping. The desired product was isobutylene and the desired aluminum alkyl product was a mixture of trihexyl aluminum, trioctyl aluminum and tridecyl aluminum and various cross-combinations of these radicals on aluminum molecules, the percentage of isobutyl radicals in such product being vanishingly small.

The top feed on an hourly basis was:

| | Pounds |
|---|---|
| Aluminum triisobutyl | 8.65 |
| Octenes (⅔ vinyl, ⅓ non-vinyl) | 3.45 |
| Decenes (same ratio) | 11.61 |
| Dodecenes (essentially all vinyl) | .20 |

The bottom feed on an hourly basis was:

| | |
|---|---|
| Hexenes (⅔ vinyl, ⅓ non-vinyl) | 6.34 |

The overhead product contained:

| | |
|---|---|
| Isobutylene | 7.20 |
| Hexenes (about 50% vinyl) | 1.57 |

The bottom product (21.5 lb./hr.) contained:

| | Weight percent |
|---|---|
| Aluminum triisobutyl | 1.05 |
| Aluminum trihexyl | 20.42 |
| Aluminum trioctyl | 11.21 |
| Aluminum tridecyl | 41.15 |
| Aluminum tridodecyl | 3.89 |
| Aluminum trialkyl dimers | .70 |
| Isobutylene | .38 |
| Hexenes (⅔ vinyl, ⅓ non-vinyl) | 2.97 |
| Octenes (same ratio) | 1.53 |
| Decenes (same ratio) | 12.68 |
| Dodecenes | .75 |
| Olefin dimers | 3.27 |
| | 100.00 |

Operating pressure in the column was 45 pounds per square inch (gage).

Temperatures:

| | |
|---|---|
| Top feed (from 78) °C | 226 |
| Reactor (average) °C | 228 |
| Bottom feed (from 80) °C | 212 |
| Reboiler temperature °C | 203 |
| Overhead vapor (between cooler 73 and condenser 74) °C | 126 |

Overhead flow rate (from the condenser) ml./hr. liquid __ 1820

Displacement (percentage of isobutyl radicals removed from feed triisobutyl aluminum) percent __ 97.4

Conversion of aluminum to hydride __do____ 1.4

EXAMPLE 3

In this run the aluminum alkyl to be subjected to displacement was aluminum triisobutyl and the displacing material was a mixture of dodecene-1, tetradecene-1, and hexadecene-1 as shown below. These components were mixed, preheated and fed essentially as liquid to the top of the reactor 70 of FIG. 2. There was no bottom feed of displacing material per se, however a stripper material, isooctane, was supplied to the reboiler to produce the countercurrent (upward) vapor flow of the displacing olefins. An extremely high displacement of 99.3% of the input isobutyl groups contained in the feed triisobutyl aluminum was obtained. The external recirculation of olefins was about 10%.

Reactor top feed was at a rate of 29.6 pounds per hour at 221° C. and the stripper feed (isooctane) at bottom was at a rate of 1.9 pounds per hour at 246° C. The stripper material was condensed from the overhead, separated by distillation devices 83 and 84 and returned to the reboiler. The displacing olefins were fed at a mere 10% excess over that theoretically required to displace all the isobutylene groups from the aluminum. This excess displacing olefin passed overhead from the reactor and was separated from the displaced isobutylene by distillation devices 83 and 84 and returned to the reactor. Reactor temperature was 230° C., reboiler temperature was 189° C., overhead vapor temperature 25° C. Reactor pressure was 7 pounds per square inch (gage).

Feed "olefin" analysis was approximately 45% dodecenes, 34% tetradecenes and 21% hexadecenes. The vinyl olefin content of the feed was 71%, with the balance being approximately 20% internal olefin, 5% vinylidene olefins and 4% paraffin. The feed "olefin" was mixed with aluminum triisobutyl in the ratio of 100 pounds to 22.5 pounds, providing the 10% excess of vinyl olefin. In this instance the paraffin and non-vinyl olefins were not included in the computation since they are substantially inert.

The product analysis was as follows:

| | Weight percent |
|---|---|
| Triisobutyl aluminum | .01 |
| Tridodecyl aluminum | 29.40 |
| Tritetradecyl aluminum | 20.19 |
| Trihexadecyl aluminum | 13.00 |
| Aluminum hydride | 1.5 |

The foregoing are on an average basis since the alkyl radicals in the trialkyl aluminum molecules can be mixed.

| | |
|---|---|
| Vinyl olefin | 5.4 |
| Vinylidene olefin | 3.3 |
| Internal olefin | 16.3 |
| Paraffin | 9.8 |
| Dimers | 1.1 |
| | 100.00 |

The product contained 2.835% aluminum or .3150 mol per 100 pounds. The mols of aluminum in triisobutyl aluminum content of product was .0021. Corresponding displacement was $$\frac{(.3150-.0021)}{.3150}\times 100 = 99.3\%$$

Similar results are achieved where the stripper gas is omitted and the displacing olefin feed and recycle is entirely to the bottom of the column, the displacement reactor pressure being reduced to about 1 to 5 p.s.i.a. absolute to achieve the desired vapor flow of the displacing olefins.

EXAMPLE 4

Input trialkyl aluminum material and displacing olefin were fed to top and bottom respectively of the column of FIG. 1 having an internal diameter of 2.5 inches with ten trays on a 3 inch spacing and with feed distributing sieve plates. The column was maintained at a reaction temperature of 200° C. and a pressure of 2 pounds per square inch absolute.

Product olefins and effluent trialkyl aluminum were obtained at the top and bottom of the reactor, respectively.

The feed alkyl material analyzed as follows on a weight percent basis. The "moieties" term indicates merely that the alkyl groups are distributed with not necessarily identical groups on each aluminum molecule.

| | Weight percent |
|---|---|
| Trinormal butyl aluminum moieties | 2.85 |
| Trinormal hexyl aluminum moieties | 6.38 |
| Trinormal octyl aluminum moieties | 18.23 |
| Trinormal decyl aluminum moieties | 21.63 |
| Trinormal dodecyl aluminum moieties | 24.23 |
| Trinormal tetradecyl aluminum moieties | 9.27 |
| Trinormal hexadecyl aluminum moieties | 2.21 |
| Trinormal octadecyl aluminum moieties | 0.10 |
| Trinormal eicosyl+ aluminum moieties | 0.15 |
| Hexadecene-1 (vinyl) | 0.25 |
| Decene (internal) | 1.20 |
| Dodecene (internal) | 2.61 |
| Tetradecene (internal) | 3.57 |
| Hexadecene (internal) | 1.06 |
| Octene (vinylidene) | 0.43 |
| Decene (vinylidene) | 1.01 |
| Dodecene (vinylidene) | 2.37 |
| Tetradecene (vinylidene) | 1.93 |
| Hexadecene (vinylidene) | 0.52 |
| | 100.00 |

The feed olefin analyzed as follows on a weight percent basis.

| | |
|---|---|
| Decene-1 (vinyl) | 1.35 |
| Dodecene-1 (vinyl) | 50.26 |
| Tetradecene-1 (vinyl) | 17.24 |
| Hexadecene-1 (vinyl) | 4.09 |
| Octadecene-1 (vinyl) | 0.04 |
| Dodecene (internal) | 7.72 |
| Tetradecene (internal) | 6.41 |
| Hexadecene (internal) | 2.17 |
| Dodecene (vinylidene) | 2.95 |
| Tetradecene (vinylidene) | 5.48 |
| Hexadene (vinylidene) | 2.19 |
| Octadecene (vinylidene) | 0.10 |
| | 100.00 |

The total trialkyl aluminum material fed during the run was 224 grams. The total olefin material fed was 340 grams. The vinyl olefin content of the feed amounted to 1.4115 mols. The trialkyl aluminum material content of the feed amounted to 1.3352 on a moiety basis which takes into consideration the presence of three alkyl groups in each molecule of Al(R)$_3$. Thus a moiety actually corresponds in molecular weight to R plus 1/3 of the molecular weight or aluminum or 27/3. This is the standard basis for determinations of mol ratios for this type of operation. Actually the feed shows a specific ratio of 1.057 corresponding to a 5.7% excess olefin fed overall. It is evident that a different "excess" exists for each olefin component however this does provide a basis for comparison of results of this process with the prior art, such as Zosel, and an equivalent result with the Zosel process generally requires about 4:1 ratio (400% excess) of olefin to trialkyl aluminum material fed (mols to moieties).

The product streams analyzed as follows, again on a weight percent basis.

Aluminum alkyl stream (product):

| | |
|---|---|
| Trinormal butyl aluminum moieties | 0.13 |
| Trinormal hexyl aluminum moieties | 1.27 |
| Trinormal octyl aluminum moieties | 4.58 |
| Trinormal decyl aluminum moieties | 7.73 |
| Trinormal dodecyl aluminum moieties | 45.93 |
| Trinormal tetradecyl aluminum moieties | 24.78 |
| Trinormal hexadecyl aluminum moieties | 7.10 |
| Trinormal octadecyl aluminum moieties | 0.20 |
| Trinormal eicosyl+ aluminum moieties | 0.14 |
| Hexadecene-1 (vinyl) | 0.02 |
| Octadecene-1 (vinyl) | 0.14 |
| Dodecene-1 (vinyl) | 1.83 |
| Tetradecene-1 (vinyl) | 1.12 |
| Hexadecene-1 (vinyl) | 0.29 |
| Dodecene (internal) | 1.13 |
| Tetradecene (internal) | 0.60 |
| Hexadecene (internal) | 0.65 |
| Dodecene (vinylidene) | 0.60 |
| Tetradecene (vinylidene) | 0.75 |
| Hexadecene (vinylidene) | 1.01 |
| | 100.00 |

Olefin stream (produce):

| | |
|---|---|
| Butylene-1 | 0.78 |
| Hexene-1 | 3.32 |
| Octene-1 | 9.46 |
| Decene-1 | 10.79 |
| Dodecene-1 | 22.05 |
| Tetradecene-1 | 2.55 |
| Hexadecene-1 | 0.25 |
| Octene (internal) | 0.12 |
| Decene (internal) | 1.36 |
| Dodecene (internal) | 13.01 |
| Tetradecene (internal) | 7.23 |
| Hexadecene (internal) | 2.98 |
| Hexene (vinylidene) | 0.28 |
| Octene (vinylidene) | 0.39 |
| Decene (vinylidene) | 2.83 |
| Dodecene (vinylidene) | 11.52 |
| Tetradecene (vinylidene) | 7.82 |
| Hexadecene (vinylidene) | 3.26 |
| | 100.00 |

The total product trialkyl aluminum stream weighed 260 grams and the total product olefin stream weighed 275 grams.

The percentage displacement realized differed for each component. For the C$_6$ material, that is hexene-1 and trinormal hexyl aluminum, the displacement was approximately 80% which was calculated by subtracting the mols of C$_6$ alkyl in the product from the mols of C$_6$ alkyl in the feed and dividing by the mols of C$_6$ alkyl in the feed.

$$(0.15-0.03)/0.15=0.8 \text{ or } 80\%$$

Displacements for higher components is a less straightforward computation.

In view of the specific 99% displacement of the previous examples these may seem poor and confusing however one must recall that previous examples dealt with either a vertually pure displacing olefin or a pure feed trialkyl aluminum material. Here all feeds and all products are mixtures. Thus the significance of improvement in displacement percentages for this type operation must be in comparison to comparable results of the prior art processes with similar feeds and products. Again results such as those given above as to peaking of the product alkyl require about a 4:1 ratio of displacing olefin to trialkyl aluminum material in comparison to the 1.057 ratio of the present example.

From the foregoing it is obvious that numerous variations of the teachings of the present invention are possible and that combinations and manipulations of the individual embodiments and apparatus illustrations can be made without exceeding the scope thereof as defined in the appended claims.

What is claimed is:

1. An improved process for displacing organic residues contained on aluminum comprising:
   feeding alkyl aluminum material through a reaction zone in the liquid phase,
   feeding a displacing material through the reaction zone in the vapor phase in countercurrent flow relative to the flow of alkyl aluminum material,
   maintaining conditions in the reaction zone which are favorable to the interaction of said alkyl aluminum material and said displacing material whereby the alkyl residues of the aluminum material are changed,
   and recovering alkyl aluminum material whose alkyl residues were changed in the displacing reaction.

2. The process of claim 1 wherein the reaction zone is elongated and divided to provide a finite dwell time for the alkyl aluminum material which is greater than that corresponding to gravity fall.

3. The process of claim 1 wherein the displacing material is olefin, wherein the displacement releases olefins corresponding in carbon atoms per molecule to the atoms in the residues on the feed alkyl aluminum material, and wherein the released olefins are recovered.

4. The process of claim 1 whrein the feed alkyl aluminum material is trialkyl aluminum.

5. The process of claim 1 wherein the feed alkyl aluminum material contains normal alkyl residues, each residue having from about two to about twenty carbon atoms and the displacing material is olefin of at least one component having from about two to about twenty carbon atoms per molecule, said olefin having a different percentage distribution of components in terms of carbon atoms per molecule from that of the distribution of residues in terms of comparable carbon atoms per residue in the feed alkyl aluminum material.

6. The process of claim 1 wherein the feed alkyl aluminum material contains normal alkyl residues ranging from about two to about twenty carbon atoms per residue and the displacing material is predominantly ethylene.

7. The process of claim 1 wherein the feed alkyl aluminum material contains residues which are predominantly isobutyl and the displacing material is a mixture of olefins whose components are in the range of about two to about twenty carbon atoms per molecule.

8. The process of claim 1 wherein the feed alkyl aluminum material contains a plurality of residue components having from about two to about twenty carbon atoms per residue, peaked as to percentage of each component toward an end of the specified range of carbon atoms per residue, and the displacing material is olefin whose principal components are included within the range of from about two to about twenty carbon atoms per molecule and are peaked as to mol percentage of the components near the middle of the specified range of carbon atoms per molecule.

9. The process of claim 1 wherein the reaction zone is maintained at a temperature from about 90° C. to about 300° C. and the pressure is controlled to maintain the vapor phase condition of the displacing material and a substantially liquid phase of alkyl aluminum material.

10. The process of claim 1 wherein the reaction zone is maintained at a temperature from about 90° C. to about 300° C. and the pressure is controlled to maintain the vapor phase condition of the displacing material and a substantially liquid phase of alkyl aluminum material, a stripper gas having a higher vapor pressure than the average of the displacing material being supplied to the reactor in the region of exit of the alkyl aluminum material to enhance the volatility of the displacing material.

11. The process of claim 1 wherein the reaction zone is maintained at a temperature of from about 175° C. to about 250° C. and the displacing material is olefin of molecular weight higher than hexene.

12. The process of claim 1 wherein the reaction zone is maintained at a temperature of about 200° C. and the displacing material is olefin of molecular weight higher than hexene.

13. The process of claim 1 wherein the reaction zone is maintained at a temperature of about 200° C. and the displacing material is olefin predominating in dodecene-1 and tetradecene-1.

14. The process of claim 1 wherein the reaction zone is maintained at a temperature from about 90° C. to about 125° C. and the displacing material is olefin of molecular weight up to about hexene.

15. The process of claim 1 wherein the reaction zone is maintained at a temperature from about 100° C. to about 120° C. and the displacing material is lower olefin of molecular weight up to about hexene.

16. The process of claim 1 wherein the reaction zone is maintained at a temperature of about 110° C. and the displacing material is olefin predominating in ethylene.

17. A process for recovering trialkyl aluminum values from an olefin polymerization effluent stream in which substantially all trialkyl aluminum is of higher molecular weight than triethyl aluminum comprising:
  feeding the effluent stream into the top of a vertically elongated reaction zone, said zone being subdivided to provide a finite dwell time for the effluent stream greater than that of free gravity fall,
  feeding vapor phase displacing material predominating in ethylene at the bottom of the reaction zone whereby countercurrent flow thereof relative to the principal flow of the effluent stream is maintained,
  maintaining the reaction zone at a temperature of about 110° C. and a pressure of about 600 pounds per square inch gage,
  and recovering triethyl aluminum from effluent from the bottom of the reaction zone.

18. A process for producing trialkyl aluminum compounds peaked on a percentage basis at a selected number of carbon atoms in the alkyl residues contained on the aluminum comprising:
  feeding trialkyl aluminum material through a reaction zone in the liquid phase, the residues of said trialkyl aluminum material as fed having a different distribution as to percentages of residues of the various numbers of carbon atoms per residue than that in the desired product, said reaction zone being elongated and divided to provide a finite dwell time for the alkyl aluminum material which is greater than that corresponding to gravity fall,
  feeding displacing olefin through the reaction zone in the vapor phase in countercurrent flow relative to the flow of trialkyl aluminum material, said olefin predominating in components whose carbon atoms per molecule correspond substanitally to the desired peak components of the residues of product trialkyl aluminum material, expressed as carbon atoms per residue,
  maintaining said reaction zone at a temperature of about 200° C. and a pressure of about 2 pounds per square inch absolute,
  recovering effluent trialkyl aluminum material and recovering effluent olefins.

19. The process of claim 18 wherein the feed trialkyl aluminum material is a molecular weight distributed product of chain growth of ethylene on an aluminum alkyl.

20. A process for producing straight chain trialkyl aluminum compounds in which the individual alkyl radicals have from about 4 to about 20 carbon atoms each comprising:
  feeding a trialkyl aluminum material through a reaction zone in the liquid phase, the residues of said trialkyl aluminum material as fed having a branched chain structure with from about 3 to about 10 carbon atoms per molecule, said reaction zone being elongated and divided to provide a finite dwell time for the trialkyl aluminum material which is greater than that corresponding to gravity fall,
  feeding displacing olefin through the reaction zone in the vapor phase in countercurrent flow relative to the flow of trialkyl aluminum material, said feed olefin substantially corresponding to the desired product trialkyl aluminum compounds on a basis of distribution as to carbon atoms per feed olefin molecule and carbon atoms per product alkyl radical,
  maintaining said reaction zone at a temperature of about 200° C. and a pressure of from about 7 to about 45 pounds per square inch gage,
  recovering effluent trialkyl aluminum material, and recovering effluent olefins.

21. The process of claim 20 wherein the feed trialkyl aluminum material is triisobutyl aluminum.

22. The process of claim 20 wherein at least a part of the olefin feed is mixed with the feed trialkyl aluminum material and enters the reaction zone therewith in the liquid phase, travels through a part of the reaction zone in the liquid phase, undergoes a transition to the vapor phase, and reverses its direction of flow in the reactor to travel countercurrent relative to the flow of trialkyl aluminum material.

23. The process of claim 20 wherein at least a part of the olefin feed is mixed with the feed trialkyl aluminum material and enters the reaction zone therewith in the liquid phase, travels through a part of the reaction zone in the liquid phase, undergoes a transition to the vapor phase, a stripper material being added to the reaction zone to enhance the transition to the vapor phase and the countercurrent flow of displacing olefins relative to trialkyl aluminum material.

(References on following page)

References Cited

UNITED STATES PATENTS

| | | | |
|---|---|---|---|
| 2,192,124 | 2/1940 | Brill et al. | 23—1 |
| 2,835,689 | 5/1958 | Ziegler et al. | 260—448 |
| 3,180,881 | 4/1965 | Zosel et al. | 260—448 |
| 3,210,435 | 10/1965 | Kennedy et al. | |

OTHER REFERENCES

Perry, John H.: Chemical Engineers' Handbook, McGraw-Hill Book Company, Inc., 2nd ed., 1941, page 1195.

TOBIAS E. LEVOW, *Primary Examiner.*

H. M. S. SNEED, *Assistant Examiner.*